P. M. GARSON.
EMERGENCY TIRE.
APPLICATION FILED JAN. 24, 1921.
1,394,410.
Patented Oct. 18, 1921.
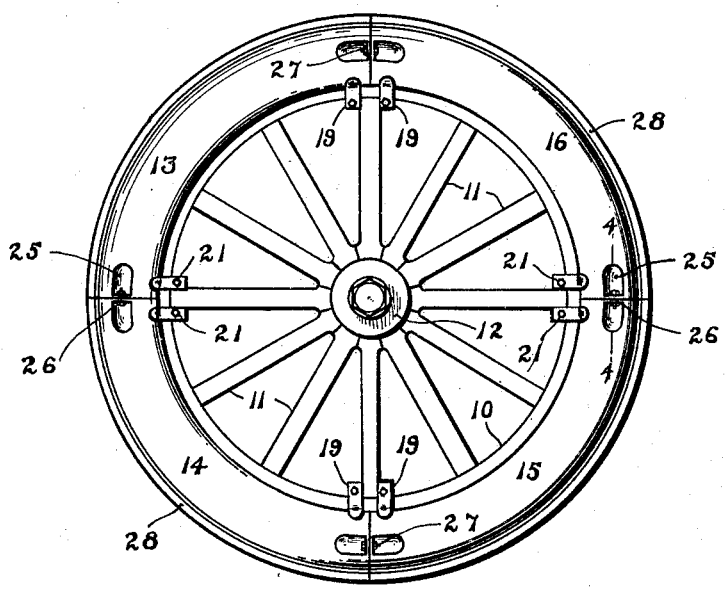
Fig. 1.
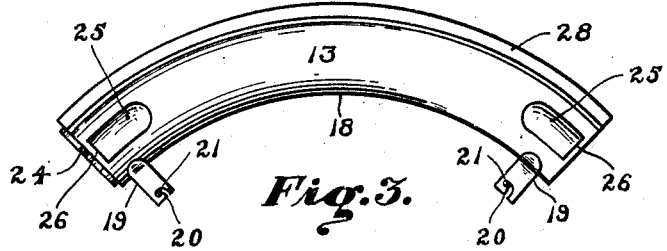
Fig. 3.
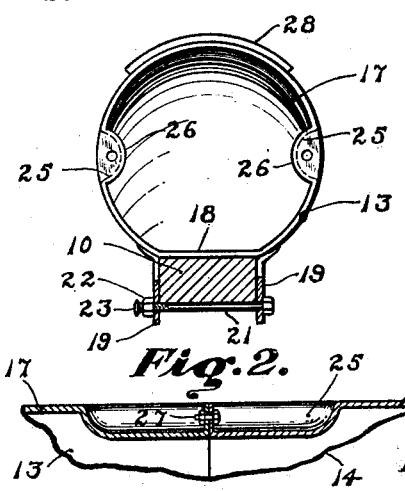
Fig. 2.
Fig. 4.
Peter M. Garson
INVENTOR
BY Victor J. Evans
ATTORNEY
WITNESS:

UNITED STATES PATENT OFFICE.

PETER M. GARSON, OF PHILADELPHIA, PENNSYLVANIA.

EMERGENCY-TIRE.

1,394,410.  Specification of Letters Patent.  Patented Oct. 18, 1921.

Application filed January 24, 1921. Serial No. 439,561.

*To all whom it may concern:*

Be it known that I, PETER M. GARSON, a citizen of the United States, residing at Philadelphia, in the county of Philadelphia and State of Pennsylvania, have invented new and useful Improvements in Emergency-Tires, of which the following is a specification.

This invention relates to emergency tires for vehicles and it has more particular reference to sectional substitute tires which are adapted for quick application to the rims of wheels when an ordinary pneumatic tire gets punctured or damaged beyond quick repair.

The main object of my invention is to provide an emergency tire of the type referred to including a plurality or series of sections detachably secured together, whereby said tire when not in use may be compactly stored away in a minimum of space, and readily and promptly set up or applied whenever necessary.

Another object of this invention is the provision of an emergency tire which will retain its shape under all normal conditions and which affords a temporary means whereby a vehicle can be continued in operation without injury to the rim or wheels.

A further object of this invention is the provision of a simple, cheap and durable emergency tire comprising but few parts which can be assembled or disassembled with the minimum expenditure of time and labor.

With the foregoing and other objects in view as will later on become more apparent as this description proceeds my invention consists essentially in providing an emergency tire including a series or plurality of tubular sections adapted for inter-engaging connection, said tire having a resilient tread and means whereby it can be secured on a vehicle wheel rim.

In the further disclosure of the invention reference is to be had to the accompanying sheet of explanatory drawings constituting a part of this specification, and in which like characters of reference designate the same or corresponding parts in all the views.

Figure 1 is an elevation of my improved emergency tire as assembled and applied to the rim of a vehicle wheel.

Fig. 2 is a transverse section of the emergency tire drawn to an enlarged scale and illustrating the means for clamping the same on the wheel rim.

Fig. 3 is a side view of one of the emergency tire sections; and

Fig. 4 is an enlarged sectional detail taken approximately on the line 4—4 in Fig. 1.

Referring more particularly to the views the numeral 10 designates the felly of an ordinary automobile wheel, 11 the spokes thereof and 12 the hub, said parts being of any of the ordinary and well known patterns and constituting no feature of this invention.

My improved emergency tire conveniently includes four equal sections 13, 14, 15 and 16, and in view of the fact that each said section is of identical shape, contour and so forth, I will only describe in detail one of them, as an understanding of the entire set therefrom will be readily comprehended by those skilled in the art to which this invention appertains.

Each section is preferably made of seamless steel tubing 17 bent longitudinally to conform arcuately to the outer peripheral surface of the aforesaid wheel felly 10, that is to say it is fashioned to provide an inner flat portion 18 for seating on said felly 10, radially depending and opposed spaced lugs 19 being welded or otherwise attached thereto for bridging the felly 10 and preventing lateral displacement of the tire when in use. These lugs 19 are provided with bayonet notches 20 for the reception of cross bolts 21 for clamping the section 13 on the felly 10, the nuts 22 whereof are threaded on to and the outer ends 23 being afterward riveted over to prevent loss; or, a cotter pin—not shown—may be driven through a hole provided for its reception to serve the same purpose as will be clear to those acquainted with the manufacture of such articles.

In order to insure inter-engagement or interlocking connection of the several sections I preferably insert at one end of each section an annular collar 24 which projects slightly beyond the end of said section, and at diametrically opposed points I form longitudinally disposed or tangential indents or grooves 25 which provide end flanges or members 26 that are holed to receive bolts 27 by means of which the abutting ends of the inter-connecting sections are firmly and securely bonded together, so that uniformity and complete continuity of the tire results when the tire is set up or in use.

Longitudinally of the outer peripheral surface of each of the several sections 13, 14, 15 and 16, I cement or otherwise secure a resilient strip or tread 28 of appropriate material—such as hard rubber—and of requisite dimensions to constitute a suitable running and wearing surface.

Assuming that the owner of a tire or tires constructed as above set forth meets with an accident to one of the pneumatic tires on his automobile or other vehicle, said damaged tire is first removed, and the emergency tire applied by clamping each section 13, 14, 15, 16, on the wheel felly 10 in the manner described, it being noted that the radial lugs 19 and cross bolts 21 are so positioned to be adjacent or in juxtaposition to a spoke 11. Furthermore, it will be readily seen that when the several sections 13, 14, 15 and 16 are assembled on the felly 10 as shown, that a snug fit is attained while the collars 24 insure that the abutting ends of adjoining sections are evenly jointed whereby a complete and serviceable emergency tire results.

From the foregoing description it will be seen that an emergency tire built up of sections as shown and described is very simple and efficient, and that in the event of a pneumatic tire being punctured or otherwise damaged, the same may be removed from the wheel felly and the emergency tire easily and quickly put in the place thereof, thereby providing a means for the continuance of the journey to a place for repairs or replacement of the damaged tire, a very important feature when traveling long distances or between isolated localities. Still further I would here remark that while I have shown and illustrated the best form of the invention at present known to me changes and variation thereof to accommodate said invention to different types of wheels will be self-evident, and it is intended to hereby include all such reasonable changes and modifications as fairly fall within the scope of the appended claims.

Having described my invention what I claim as new and desire to secure by Letters Patent is:—

1. An emergency tire for vehicle wheels comprising a plurality of non-resilient tubular inter-engageable sections, each of said sections having an inner arcuate face adapted for seating on—and spaced radially disposed lugs for engaging the sides of—the wheel rim, a reduced annular flange at one end of the section for insertion into the abutting end of the adjoining section, means for connecting the ends of the sections firmly together, and means for clamping the tire by the aforesaid lugs to the wheel rim.

2. An emergency tire for vehicle wheels comprising a plurality of non-resilient tubular inter-engageable sections, each of said sections having an inner arcuate face adapted to seat on—and spaced opposed radially disposed lugs for engaging the sides of—the wheel rim, bayonet slots in said lugs, a reduced annular flange at one end of the section for insertion into the abutting end of the adjoining section, opposed indents at each end of the tubular section, means for connecting abutting sections together at the indented portions, and means for coöperation with the bayonet slotted lugs for clamping the tire rigidly to the wheel rim.

3. An emergency tire for vehicle wheels comprising a plurality of tubular steel inter-engageable sections, each of said sections having an inner arcuate face adapted to seat on—and spaced radially disposed lugs for engaging the sides of—the wheel rim, bayonet slots in said lugs, a reduced annular flange at one end of the section for insertion into the abutting end of the adjoining section, tangentially disposed indents at each end of the section providing inwardly projecting flanges, means for connecting abutting sections together by the inwardly projecting flanges, and means for coöperation with the bayonet slotted lugs for clamping the tire rigidly to the wheel rim.

4. An emergency tire for vehicle wheels comprising a plurality of tubular steel inter-engageable sections, each of said sections having an inner arcuate face adapted to seat on—and spaced radially disposed lugs for engaging the sides of—the wheel rim, bayonet slots in said lugs, a reduced annular flange at one end of the section for insertion into the abutting end of the adjoining section, tangentially disposed indents at each end of the section providing inwardly projecting flanges, an outer peripheral resilient tread on each section, means for connecting abutting sections together by the inwardly projecting flanges, and means for coöperation with the bayonet slotted lugs for clamping the tire rigidly to the wheel rim.

In testimony whereof I affix my signature.

PETER M. GARSON.